United States Patent
Guerif et al.

(10) Patent No.: US 10,712,088 B1
(45) Date of Patent: Jul. 14, 2020

(54) TEMPERATURE BALANCING FOR THERMAL INTEGRATION OF AN AIR SEPARATION UNIT (ASU) WITH A POWER GENERATION SYSTEM

(71) Applicant: L'Air Liquide, Société Anonyme pour l'Etude et l'Exploitation des Procédés Georges Claude, Paris (FR)

(72) Inventors: Pierre-Philippe Guerif, Houston, TX (US); Alain Guillard, Houston, TX (US); Vincent Follaca, Houston, TX (US)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 250 days.

(21) Appl. No.: 15/971,695

(22) Filed: May 4, 2018

Related U.S. Application Data

(60) Provisional application No. 62/502,189, filed on May 5, 2017.

(51) Int. Cl.
  *F25J 3/04* (2006.01)
  *F23L 7/00* (2006.01)
  *F23L 15/00* (2006.01)

(52) U.S. Cl.
  CPC ......... *F25J 3/04533* (2013.01); *F23L 7/007* (2013.01); *F23L 15/00* (2013.01)

(58) Field of Classification Search
  CPC ......... F25J 3/04533; F23L 7/007; F23L 15/00
  USPC ............... 95/288; 62/600, 614, 617, 640
  See application file for complete search history.

(56) References Cited

U.S. PATENT DOCUMENTS

| | | | | |
|---|---|---|---|---|
| 4,303,428 A | * | 12/1981 | Vandenbussche | F25J 3/0409 62/646 |
| 4,731,102 A | * | 3/1988 | Yoshino | F25J 3/04018 62/654 |
| 5,560,763 A | * | 10/1996 | Kumar | B01D 53/047 95/98 |
| 6,189,337 B1 | * | 2/2001 | Mathews | F25J 3/04018 62/642 |
| 7,284,362 B2 | * | 10/2007 | Marin | F01K 21/042 60/39.182 |

* cited by examiner

*Primary Examiner* — Frank M Lawrence, Jr.

(74) *Attorney, Agent, or Firm* — Elwood L. Haynes; Allen E. White

(57) ABSTRACT

A method of temperature balancing for thermal integration of an air separation unit (ASU) with an oxycombustion power generation system, including compressing air through a plurality of compression stages, and routing a first stage compressed air stream through a first heat exchanger in heat exchange communication with a subsequent stage compressed air stream to lower the first stage compressed air stream temperature and increase the temperature of a subsequent stage compressed air stream.

4 Claims, 1 Drawing Sheet

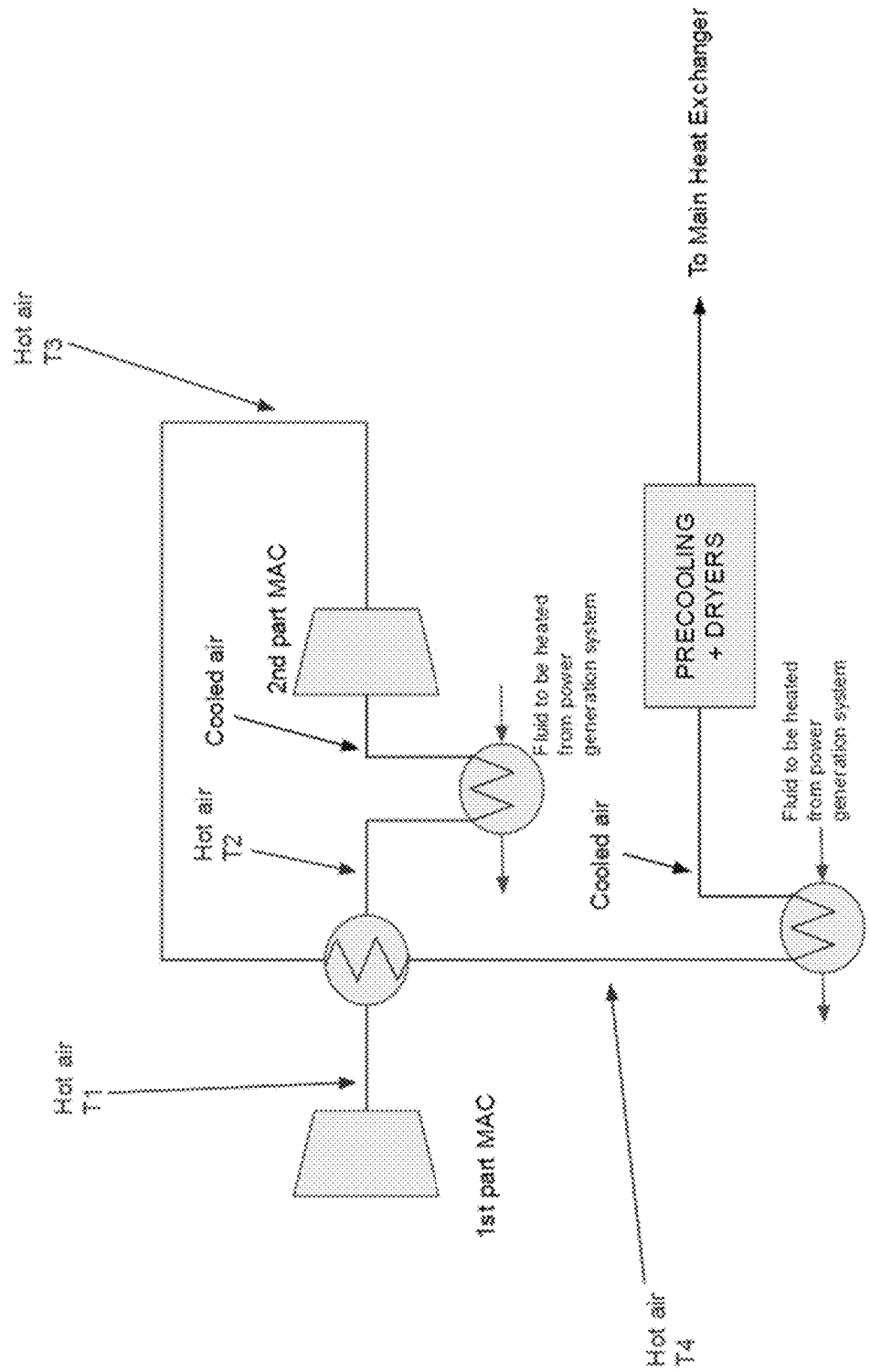

TEMPERATURE BALANCING FOR THERMAL INTEGRATION OF AN AIR SEPARATION UNIT (ASU) WITH A POWER GENERATION SYSTEM

For power generation systems with oxycombustion, the oxygen is usually supplied by an ASU nearby. It is possible to envision some thermal integration between the power generation system and warm air coming from one or several uncooled or partially cooled Main Air Compressor(s) or/and booster(s) of the ASU. Some power plants can require some heat to be transferred. This heat can be supplied via the warm air with a minimum and/or maximum temperature as well as a minimum and/or maximum pressure from the ASU to the power plant. Some of those constraints can be difficult to achieve as it must stay within the capabilities of the turbomachinery as well as the pressure and temperature requirements of the ASU.

Achieving a minimum pressure of the warm air stream for the thermal integration can lead to a too high temperature at this level of pressure (mechanical constraints issues with the air compressor or temperature too high for the thermal integration). To overcome this issue, it is possible to reduce the temperature of this warm air stream and recover the heat by adding an exchanger to cool the high temperature air stream against a second lower temperature air stream that will also be used for thermal integration with the power generation system as well.

FIG. 1 is a flow diagram in accordance with an embodiment of the invention.

In some embodiments, the MAC may have at least a first compression stage and a second compression stage in series. In this particular case, the MAC outlet pressure (that is to say, at the outlet of the second compression stage) needs to be at high pressure (typically between 10 and 35 bar). Thus, the outlet pressure of the first compression stage would necessarily be at a pressure of less than 10 and 35 bar, depending on the outlet pressure of the second compression stage. In all cases, the outlet pressure of the first compression stage will be less than about 10 bar. Some thermal integration needs to be done with the power generation system with a minimum pressure required for the hot air streams to be sent to the power generation system. Moreover, for an easier integration, the temperature of both air streams should be close (typically less than 20 degC. difference). Because of the high pressure at the outlet of the MAC, more compression heat is available and two hot air streams can be used for the thermal integration (taken after a first part and second part of the MAC). Because of the minimum pressure required, the hot air temperature T1 after the MAC first compression part is very high compared to the hot air temperature T3 after the second compression part. One way to balance both hot air temperatures is to cool the hot air stream at the outlet of the first compression part of the MAC to a temperature T2 by heating the hot air at the outlet of the second compression part of the MAC from a temperature T3 to T4. The goal is to have both temperature T2 and T4 close so that the thermal integration with the power generation system is made easier.

This integration concept can be applied to two or more air streams coming out of the same or different machines (such as main air compressor and booster air compressor for example).

The invention claimed is:

1. A method of temperature balancing for thermal integration of an air separation unit (ASU) with an oxycombustion power generation system, the method comprising the steps of:
   a. compressing air through a plurality of compression stages,
   b. routing a first stage compressed air stream through a first heat exchanger in heat exchange communication with a subsequent stage compressed air stream to lower the first stage compressed air stream temperature and increase the temperature of a subsequent stage compressed air stream,
   c. taking the cooled first stage compressed air stream from step b) and routing the cooled first stage compressed air stream through a second heat exchanger in heat exchange communication with a first fluid going to the power generation system to further cool the cooled, first stage compressed air stream and increase the temperature of the first fluid going to the power generation system,
   d. routing the further cooled, first stage compressed air stream to a subsequent compression stage to produce the subsequent air stream that is further compressed and heated from the compression,
   e. routing the subsequent compressed air stream exiting from the heat exchanger in step b) to a third heat exchanger in heat exchange communication with the first and/or a second fluid going to the power generation system to cool the subsequent air stream exiting from the heat exchanger.

2. The method of claim 1, further comprising routing the cooled subsequent air stream of step e) to precooling and drying steps and then to a main heat exchanger of the air separation unit.

3. The method of claim 1, wherein the first stage compression is a MAC producing the first stage compressed air stream at less than about 10 bar.

4. The method of claim 1, wherein the temperatures of the cooled first stage compressed air stream exiting from the heat exchanger in step b) and the subsequent compressed air stream exiting from the heat exchanger in step b), are with twenty degrees Celsius of each other.